US008627086B2

(12) United States Patent
Gehrmann et al.

(10) Patent No.: US 8,627,086 B2
(45) Date of Patent: Jan. 7, 2014

(54) SECURE LOADING AND STORING OF DATA IN A DATA PROCESSING DEVICE (75) Inventors: Christian Gehrmann, Lund (SE); Bernard Smeets, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1321 days.

(21) Appl. No.: 11/577,084

(22) PCT Filed: Sep. 7, 2005

(86) PCT No.: PCT/EP2005/009624
§ 371 (c)(1),
(2), (4) Date: Sep. 5, 2007

(87) PCT Pub. No.: WO2006/039967
PCT Pub. Date: Apr. 20, 2006

(65) Prior Publication Data
US 2008/0133929 A1    Jun. 5, 2008

Related U.S. Application Data (60) Provisional application No. 60/618,037, filed on Oct. 12, 2004.

(30) Foreign Application Priority Data

Oct. 11, 2004 (EP) ..................................... 04388069

(51) Int. Cl.
*G06F 21/00* (2013.01)

(52) U.S. Cl.
USPC .................. 713/176; 726/4; 726/9; 713/171; 713/179; 380/251; 380/270; 455/411

(58) Field of Classification Search
USPC .................................................. 713/176, 179
See application file for complete search history.

(56) References Cited

U.S. PATENT DOCUMENTS

| 5,893,119 | A   | * | 4/1999  | Squibb .................................. 1/1 |
| 5,970,143 | A   | * | 10/1999 | Schneier et al. .............. 713/181 |
| 6,026,293 | A   |   | 2/2000  | Osborn |
| 6,367,012 | B1  | * | 4/2002  | Atkinson et al. .............. 713/176 |
| 6,401,206 | B1  | * | 6/2002  | Khan et al. .................... 713/176 |
| 6,694,434 | B1  | * | 2/2004  | McGee et al. ................. 713/189 |
| 6,694,436 | B1  | * | 2/2004  | Audebert .......................... 726/9 |
| 7,116,782 | B2  | * | 10/2006 | Jackson et al. ................ 380/251 |
| 7,124,408 | B1  | * | 10/2006 | Parthasarathy et al. ....... 717/170 |
| 7,461,249 | B1  | * | 12/2008 | Pearson et al. ................ 713/156 |
| 7,565,419 | B1  | * | 7/2009  | Kwiatkowski et al. ........ 709/223 |
| 8,156,333 | B2  | * | 4/2012  | Schneider ..................... 713/168 |

(Continued)

FOREIGN PATENT DOCUMENTS

| WO | WO 02/01351 A2  | 1/2002 |
| WO | WO 03/100583 A1 | 12/2003 |

*Primary Examiner* — Morshed Mehedi (57) ABSTRACT

Disclosed is a method of loading data into a data processing device. The method comprises receiving a payload data item by the data processing device; performing a cryptographic authentication process to ensure the authenticity of the payload data item; storing the authenticated received payload data item in the data processing device; and integrity protecting the stored payload data item. The cryptographic authentication process comprises calculating an audit hash value of at least the received data item. Integrity protecting further comprises calculating a reference message authentication code value of at least the audit hash value using a secret key stored in the data processing device as an input.

19 Claims, 5 Drawing Sheets

(56) References Cited

U.S. PATENT DOCUMENTS

| | | | |
|---|---|---|---|
| 2002/0002703 A1* | 1/2002 | Baentsch et al. | 717/11 |
| 2003/0079123 A1* | 4/2003 | Mas Ribes | 713/156 |
| 2003/0105968 A1* | 6/2003 | Cheston et al. | 713/191 |
| 2003/0126443 A1* | 7/2003 | Wakao | 713/176 |
| 2003/0172089 A1* | 9/2003 | Douceur et al. | 707/200 |
| 2003/0210789 A1* | 11/2003 | Farnham et al. | 380/270 |
| 2004/0025010 A1* | 2/2004 | Azema et al. | 713/156 |
| 2004/0068652 A1* | 4/2004 | Carpentier et al. | 713/168 |
| 2004/0117623 A1* | 6/2004 | Kalogridis et al. | 713/165 |
| 2005/0021973 A1* | 1/2005 | Chen et al. | 713/176 |
| 2005/0079868 A1* | 4/2005 | Shankar et al. | 455/435.1 |
| 2005/0091545 A1* | 4/2005 | Soppera | 713/202 |
| 2005/0223229 A1* | 10/2005 | Roeder et al. | 713/171 |
| 2005/0289311 A1* | 12/2005 | Durham et al. | 711/163 |
| 2007/0014410 A1* | 1/2007 | Panjwani et al. | 380/270 |

* cited by examiner

SECURE LOADING AND STORING OF DATA IN A DATA PROCESSING DEVICE

This application claims the benefit of U.S. Provsional Application No. 60/618,037, filed Oct. 12, 2004 the disclosure of which is fully incorporated herein by reference.

Disclosed is a method, product means, and a device for secure loading and storing of data in a data processing device.

Embedded systems like mobile phones and other data processing devices depend on the execution of correct software that has not been manipulated in an unauthorised way. Manipulation of the software might lead to incorrect behavior of the device or even a breaking of the fundamental security features of the device. Hence, it is particularly important to protect the core software of the device. This can for example be achieved by storing the program into a protected memory. The memory can either be physically protected from illegal access or protected by cryptographic methods. In practice it is hard or expensive to produce memory with good physical protection and especially to protect the memory interfaces. Consequently, the most attractive solution is to use some type of cryptographic protection of the software stored in the memory.

Furthermore, software even for rather small systems becomes increasingly complex, thereby increasing the risk of errors and unintended features, especially in early releases during a software life cycle. Furthermore, the functionality of early software releases is typically limited. Consequently, there is an increasing need for frequent updates of the software stored in embedded devices.

The need for frequent updates and the desire to provide sufficient protection for the software of a data processing device create a need for security solutions that protect the software of a data processing device at storage and that allow for secure software upgrades.

U.S. Pat. No. 6,026,293 discloses a method for preventing electronic memory tampering in an electronic device. According to this prior art method, when the electronic device is to be reprogrammed by a data transfer device, the electronic device initiates a public/private key based challenge-response authentication scheme to authenticate the data transfer device. Once authenticated, the data transfer device is permitted access to reprogram the memory. Following the reprogramming of the memory, the electronic device performs a hash calculation of the modified memory contents. The calculated hash value is sent to the data transfer device for a digital signature, and the signed hash value is returned to the electronic device for storage. The signed hash value is subsequently used for auditing the integrity of the memory content, e.g. during boot-up or periodically.

Even though the above prior art method provides both authentication protection during the loading stage and integrity protection of the memory contents of the electronic device, it involves a rather complicated scheme of generating and signing the generated hash value, thereby causing the loading process to take a rather long time.

Hence, it is a problem to provide a computationally more efficient security mechanism that protects the software both during the loading of the software into the device and subsequently while the software is stored in the device.

The above and other problems are solved by a method of loading data into a data processing device, the method comprising:
  receiving a payload data item by the data processing device;
  performing a cryptographic authentication process to ensure the authenticity of the payload data item;
  storing the authenticated received payload data item in the data processing device; and
  integrity protecting the stored payload data item;
  wherein performing a cryptographic authentication process comprises calculating an audit hash value of at least the received data item; and wherein the integrity protecting further comprises calculating a reference message authentication code value of at least the audit hash value using a secret key stored in the data processing device as an input.

In particular, since the audit hash value calculated during the loading process is calculated from the received payload data, and the audit hash value is subsequently re-used during the calculation of the message authentication code, the number of necessary computations performed during the software loading is reduced, thereby increasing the computational efficiency of the method.

Furthermore, since the regular integrity protection is based on a secret key stored in the data processing device, the integrity protection is independent of any external cryptographic keys and, in particular, does not depend on a public key signature mechanism. It is an advantage that symmetric key based integrity checks, i.e. integrity checks based on a message authentication code, are computationally more efficient than public key based integrity checks involving signature verification.

The term data processing device is intended to comprise any electronic device comprising a data memory on which data can be loaded from an external source, e.g. from a data transfer system. In particular, the term data processing device is intended to comprise any electronic equipment portable radio communications equipment and other handheld or portable devices. The term portable radio communications equipment includes all equipment such as mobile telephones, pagers, communicators, electronic organisers, smart phones, personal digital assistants (PDAs), handheld computers, or the like.

The term payload data item is intended to include any data loaded into the data processing device. In particular, the term payload data item is intended to include configuration data, program code, e.g. platform software or application software intended for execution by the device, or the like.

The cryptographic authentication process may be any suitable cryptographic process for verifying the authenticity of the received data, i.e. to ensure that the data was in fact sent by the entity whose name it carries and that it was not forged or modified.

In some embodiments, the cryptographic authentication process includes
  receiving a reference hash value; and
  comparing the received reference hash value with the calculated audit hash value to verify the authenticity of the received payload data item.

In a further embodiment, the cryptographic authentication process includes digitally signing the data item according to a public key cryptosystem. The digital signing of software is an efficient and secure principle for the verification of software loaded into a mobile device. Successful verification of the signature guarantees that the software has been issued by a legitimate source. Furthermore, digital signatures based on public key techniques have the advantage that the public key used for verification does not need to be confidentiality protected at transfer or storage. Hence, the same public key can be installed in a large number of devices without compromising security. This allows efficient procedures for fast and secure software upgrade.

In some embodiments, the method comprises
  receiving the payload data item, a digital signature data item and a digitally signed digital certificate data item, wherein the digital certificate data item includes a first public key and wherein the digital signature data item includes a reference hash value encrypted with a first private key corresponding to the first public key;
  authenticating the digitally signed digital certificate data item against a root public key stored in the data processing device;
  authenticating the digital signature data item against the authenticated digital certificate;
  comparing the received reference hash value with the calculated audit hash value to verify the authenticity of the received payload data item.

Hence, the authenticity of the digital signature is ensured by the digital certificate, thereby further increasing the security of the loading process. It is understood that the data processing device may receive more than one digital certificate forming a certificate chain, wherein one certificate of the chain is verified by the public root key stored in the data processing device.

In a further embodiment, the reference hash value is cryptographically authenticated; and calculating the reference message authentication code value is performed only if the reference hash value is successfully authenticated. Consequently, execution of the message authentication code procedure in the data processing device is conditioned on the receipt of an authenticated reference hash value, thereby reducing the risk of an adversary utilising the message authentication code procedure of the data processing device to calculate unauthorised message authentication code values.

Message authentication codes (MAC) are a known mechanism for integrity protecting messages. A MAC is a function that takes a variable length input and a key to produce a fixed-length output, the so-called MAC value or tag value. MACs are typically used between two parties that share a secret key in order to validate information transmitted between these parties. In some embodiments, a MAC is calculated by applying a one-way hash function to the payload data and encrypting the result using a secret key. Examples of suitable MAC functions that can be combined with a cryptographic hash function include HMAC (Keyed-Hashing for Message Authentication), Cipher Block Chaining (CBC) MAC using for example AES or a secure one-way hash function. In the loading method described herein, a message authentication code is used to check the integrity of data stored in an unreliable or insecure medium, i.e. in this situation the MAC is used by only one party, i.e. the data processing device, when storing and retrieving the payload data item.

Consequently, in some embodiments, the integrity protecting comprises storing the calculated reference message authentication code value in relation to the received payload data item, thereby making it available for subsequent memory audits of the payload data item by the data processing device. Hence, when auditing the memory content, the device calculates the message authentication code value of the stored payload data item using the secret key stored in the device, and compares the result with the previously stored reference MAC value. Consequently, in this embodiment, the secret key need only be known to the digital processing device. In some embodiments, the secret key is a secret data item unique to the data processing device, e.g. a secret data item known only to the data processing device.

In another embodiment, calculating the reference message authentication code value further comprises calculating the reference message authentication code value of a combined data item derived from at least the audit hash value and a random number. It is an advantage of this embodiment, that the input to the MAC is not entirely dependant on the result of the authentication process, thereby further increasing the security of the data protection.

When calculating the reference message authentication code value further comprises calculating the reference message authentication code value of a combined data item derived from at least the audit hash value and a version control data item, the integrity protection is efficiently combined with a version control mechanism, since a subsequent memory audit will only be successful if both the memory content and the version control information are consistent.

In some embodiments, the version control data record is stored in a version control data structure, the version control data record including information about the received payload data item including at least the version control data item. In some embodiments, the control data structure is integrity protected.

In some embodiments, the version control data record comprises a version counter. In some embodiments, the version control data record further comprises a back counter identifying a number of previous versions that may replace the current version of the payload data item, thereby providing a simple and efficient version control mechanism including a mechanism for controlling backward compatibility.

In known software upgrade schemes where existing software is upgraded by a new version of the software, the software upgrade is often received as a so-called delta file or delta update. Such delta updates include differences of the new (updated) software relative to the current software, thereby reducing the size of the upgrade packet. In some delta-file techniques, the update file also includes commands to control the generation of the updated software version from the current software and the received update. Delta-file techniques as such are known in the art and described in e.g. "Delta storage for arbitrary non-text files", by Christian Reichenberger, Proc. Of the 3rd International Workshop on Software Configuration Management, pp. 144-152, Norway, June 1991. It is desirable to provide an efficient security mechanism that can also be applied to delta updates. This problem is solved when receiving the payload data item comprises receiving a delta update of a previously received current data item, and generating the payload data item as an updated payload data item from the previously received current data item and the received delta update. Hence, according to this embodiment, the updated payload data item is generated and the audit hash value is calculated from the generated updated payload data item. Consequently, the audit hash value can again be re-used for the calculation of the reference message authentication code of the updated payload data that is stored in the device.

According to a second aspect it is a problem of the above prior art system to provide an efficient and secure method of protecting the integrity of a current version of a data item stored in a data processing device in a situation where frequent upgrades of different versions of the stored data item occur.

The above and other problems are solved by a method of protecting the integrity of a current version of a data item stored in a data processing device, the method comprising
  determining a reference hash value of at least the data item;
  calculating a reference message authentication code value from the determined reference hash value using a secret key stored in the data processing device;
  storing the calculated reference message authentication code value in relation to the data item;

characterised in that calculating the reference message authentication code value comprises calculating the reference message authentication code value from a combined data item derived from the determined reference hash value and at least a part of a version control data record, the version control data record including version control information about the current version of the data item.

Consequently, by calculating the reference message authentication code from a combined data item derived from the determined reference hash value and at least a part of the version control data record, the integrity protection of the stored payload data is efficiently combined with a secure version control of the stored data.

The reference hash value of at least the data item may be determined by calculating the hash value from the data item or by receiving the hash value together with the data item or from an authentication process in connection with the receipt of the data item as described herein.

The term combined data item is intended to comprise any data item generated as a function of two or more data items, e.g. as a concatenation of the two or more data items where one data item is appended to the other. Hence, the combined data item derived from the determined reference hash value and at least a part of a version control data record is generated as a function of at least the reference hash value and of at least a part of a version control data record.

In some embodiments, the version control data record is integrity protected.

In some embodiments, the version control data record comprises a version counter; and calculating the reference message authentication code value comprises calculating a reference message authentication code value from a combined data item derived from the determined audit hash value and at least the version counter.

In some embodiments, the version control data record further comprises a back counter identifying a number of previous versions that may replace the current version of the payload data item, thereby providing a simple and efficient version control mechanism including a mechanism for controlling backward compatibility. In some embodiments, calculating the reference message authentication code value comprises calculating a reference message authentication code value from a combined data item derived from the determined reference hash value and at least the back counter.

In another embodiment, the version control data record further comprises the reference hash value for the current version of the data item, thereby providing a compact fingerprint of the data item.

In some embodiments, the secret key is only known to the digital processing device. Furthermore, the secret key may be a secret data item unique to the data processing device.

In some embodiments, the payload data is loaded by the first-mentioned method, thereby efficiently combining a secure loading and storing with a secure version control.

In yet another embodiment, the method further comprises
receiving a delta update of a previously received current data item; and
generating the data item as an updated data item from the previously received current data item and the received delta update.

In yet another embodiment, the method further comprises generating the version control data record; and storing the version control data record in a version control data structure, thereby making it available for a subsequent memory audit.

Accordingly, in another aspect, a method of verifying the integrity of a current version of a data item stored in a data processing device comprises
calculating an audit hash value of the data item;
calculating an audit message authentication code value from the calculated audit hash value using a secret key stored in the data processing device;
comparing the calculated audit message authentication code value with a reference message authentication code value stored in relation to the data item.

According to this aspect, the method further comprises retrieving a version control data record, the version control data record including version control information about the current version of the data item; and calculating the audit message authentication code value comprises calculating an audit message authentication code value from a combined data item derived from the calculated audit hash value and at least a part of the version control data record.

The present invention relates to different aspects including the methods described above and in the following, corresponding devices, and computer programs, each yielding one or more of the benefits and advantages described in connection with one of the above-mentioned methods, and each having one or more embodiments corresponding to the embodiments described in connection with one of the above-mentioned methods.

More specifically, according to another aspect, a data processing device comprises a first processing circuit adapted to perform the method of loading data into a data processing device described above and in the following.

In particular, it is been found that the security mechanism described herein may advantageously be applied to devices having a multi-chip architecture. In particular, when a first one of the chips accesses a memory via a second one of the chips, it is particularly important for the first chip to ensure data authenticity and integrity of the memory content.

Consequently, in some embodiments, the data processing device further comprises storage means adapted to store the received payload data item; and a second processing circuit connected to the storage means and to the first processing circuit; wherein the second processing circuit is adapted to provide to the first processing circuit at least read access to the storage means.

In a further embodiment, the first processing circuit comprises local storage means for storing a root public key of an asymmetric cryptographic system. In a further embodiment, the first processing circuit comprises local storage means for storing said secret key, thereby providing secure storage under the control of the first chip of the cryptographic keys used in the data authenticity and integrity mechanism.

According to another aspect, a data processing device comprises storage means for storing a current version of a data item and a version control data record, the version control data record including version control information about the current version of the data item; and processing means adapted to perform the method of verifying the integrity of a current version of a data item described above and in the following.

It is noted that the features of the methods described above and in the following may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Hence, according to another aspect, a computer program comprises program code means adapted to cause a data processing device to perform the steps of the method described above and in the following, when said computer program is run on the data processing device.

For example, the program code means may be loaded in a memory, such as a RAM (Random Access Memory), from a storage medium or from another computer via a computer network. Alternatively, the described features may be implemented by hardwired circuitry instead of software or in combination with software.

Figure 1:
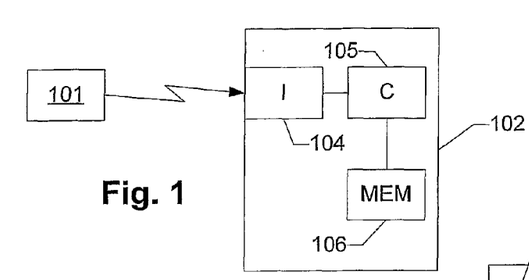
FIG. 1 shows a schematic block diagram of a system for loading data into a mobile terminal.

The above and other aspects will be apparent and elucidated from the embodiments described in the following with reference to the drawing in which:

FIG. 1 shows a schematic block diagram of a system for loading data into a mobile terminal. The system comprises a loading station 101 and a mobile terminal 102.

The loading station may be a conventional, suitably programmed computer, e.g. a PC, comprising a suitable communications interface. In some embodiments, the loading station may generate the payload data, e.g. a software version, configuration data, and/or the like, to be loaded. In particular, the loading station may generate the digital signature and certificate to be loaded together with the payload data. In other embodiments, the loading station receives the payload data and the header information from a remote computer, e.g. a personal computer, a work station, a network server, etc. For example, the data may be received via a computer network, e.g. the Internet, a local area network, an intranet, an extranet, etc., or by any other suitable means, e.g. on a computer-readable medium such as a floppy disk, a CD ROM, etc. In this embodiment, the calculation of the signature and the generation of the certificate may be performed by the remote computer rather than the loading station. The loading station performs, in cooperation with the mobile terminal, the loading of the data into the mobile terminal.

The mobile terminal 102 comprises a communications interface 104 comprising circuitry and/or devices suitable for enabling the mobile terminal to communicate data with the loading station via a wired or wireless communications link 103 such as a direct data link, a communications network, or the like. For example, the data may be loaded via a local short range wireless communications link, e.g. a Bluetooth connection, an infrared connection, or the like, or via a wired interface. In other embodiments, the data may be loaded into the mobile terminal via a communications network, e.g. over-the-air (OTA) via a cellular telecommunications network, e.g. GSM WCDMA, or the like.

Consequently, examples of suitable communications units include a wired serial connection, such as an RS-232 link, a USB connection, a FireWire connection as described in the IEEE 1394 standard, or the like. Further examples include a wireless infrared interface, or an RF interface, such as the main antenna of a cellular telephone (not shown), or another antenna within the cellular telephone, such as a Bluetooth transceiver, or the like. Other examples of suitable interfaces include a cable modem, a telephone modem, an Integrated Services Digital Network (ISDN) adapter, a Digital Subscriber Line (DSL) adapter, a satellite transceiver, an Ethernet adapter, or the like.

The mobile terminal further comprises a processing unit 105 for controlling the operation of the mobile terminal, and a memory 106. For example, the processing unit may comprise a general- or special-purpose programmable microprocessor, a Digital Signal Processor (DSP), an Application Specific Integrated Circuit (ASIC), an Programmable Logic Array (PLA), a Field Programmable Gate Array (FPGA), etc., or a combination thereof. The memory 106 may be a flash memory, an EPROM, an EEPROM, or any other type of memory or storage device, such as a non-volatile memory.

When data is loaded into the mobile terminal, the processing unit 105 performs the data authentication and integrity protection described herein and stores the data in the memory 106.

During subsequent operation of the mobile terminal, the processing unit can retrieve the loaded data from the memory 106. For example, in the case of software, the processing unit loads the software from the memory 106 in a RAM for execution.

Figure 2:
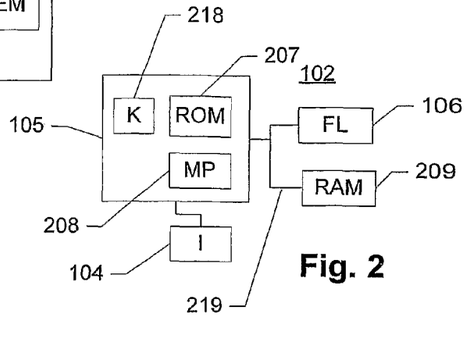
FIG. 2 shows a schematic block diagram of an example of a mobile terminal with a single chip architecture.

FIG. 2 shows a block diagram of an example of a mobile terminal with a single-chip architecture. The mobile terminal 101 comprises a controller 105 for controlling the operation of the mobile terminal. The controller 105 operates in conjunction with a flash program memory 106, and a random access memory (RAM) 209. The controller 105 includes a microprocessor 208, an internal read-only memory (ROM) 207, and a securely stored secret key 218. For example, the secret key 218 may be a chip-unique key, e.g. stored in hardware e.g. using so-called e-fuse technology. Alternatively, the secret key may be stored in the ROM 207. The ROM 207 contains boot code, hashing code, MAC code, authentication code, and a public root key. In some embodiments, the hashing code and/or the MAC code may be implemented at least partly in hardware instead or in addition to the implementation in ROM. Instruction code involved with the general operation of the cellular telephone is contained in the flash program memory 106. The RAM memory 209 is used for operations which are part of the normal mobile terminal call processing. In some embodiments, operations involving sensitive data, hash value calculations and authentication processes are carried out in conjunction with a protected static random access memory (PSRAM) (not shown) included in the microcontroller 105. The controller 105 communicates with the flash program memory 106 and the RAM 209 via a memory bus 219.

Figure 3:
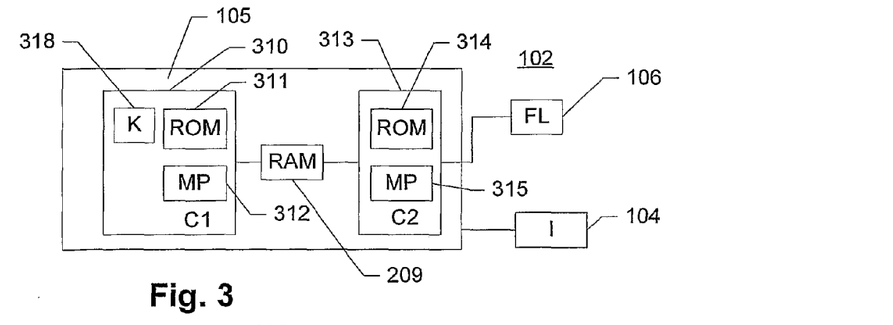
FIG. 3 shows a schematic block diagram of an example of a mobile terminal with a two-chip architecture.

FIG. 3 shows a schematic block diagram of an example of a mobile terminal with a two-chip architecture. In this embodiment, the controller 105 comprises two chips 310 and 313, respectively, an external memory 106 and an internal memory 209. The two chips each contain at least one microprocessor 312 and 315, respectively, and a ROM 311 and 314, respectively. The external memory 106 is any suitable kind of non-volatile memory, for example a flash memory. The internal memory 209 is a fast access memory, for example a RAM. In the embodiment of FIG. 3, the two chips share the internal memory 209. Furthermore, in this embodiment, only chip 313 has direct access to the external memory 106. Hence, when the processor 312 of chip 310 is to execute software stored in the external memory 106, the software to be executed is loaded into the internal memory 209 via chip 313 before it can be executed. In this embodiment, both ROMs 311 and 314 comprise boot code, but only ROM 311 comprises hashing code, MAC code, authentication code, and a public root key, and only chip 310 comprises a secret key 318. As described above, the secret key 318 may be stored in hardware e.g. using so-called e-fuse technology. Alternatively, the secret key may be stored in the ROM 311. Furthermore, in some embodiments, the hashing code and/or the MAC code may be implemented at least partly in hardware instead or in addition to the implementation in ROM.

Figure 4:
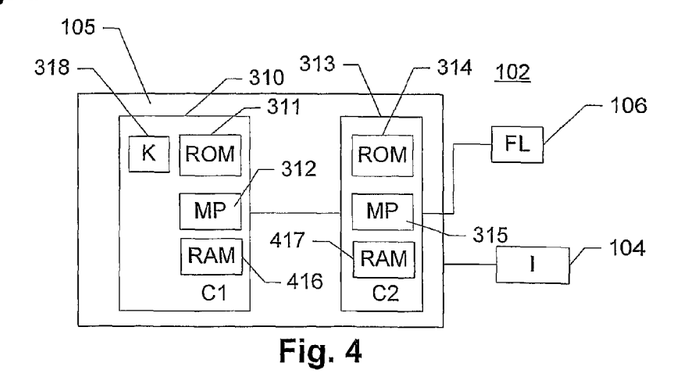
FIG. 4 shows a schematic block diagram of another example of a mobile terminal with a two-chip architecture.

FIG. 4 shows a schematic block diagram of another example of a mobile terminal with a two-chip architecture. This embodiment is similar to the embodiment of FIG. 3, except that the two chips 310 and 313 of this embodiment do not share a common internal memory. Instead, each chip has its own internal memory 416 and 417, respectively. As in the embodiment of FIG. 3, only chip 313 has direct access to the external memory 106. Hence, when the processor 312 of chip 310 is to execute software stored in the external memory 106, the software to be executed is loaded into the internal memory 416 of chip 310 via chip 313 before it can be executed.

In alternative two-chip embodiments with shared or separate RAM (Random Access Memory), both chips may have direct access to an external non-volatile memory and directly run the software to be executed from that memory or first load it into RAM and then execute.

Figure 5:
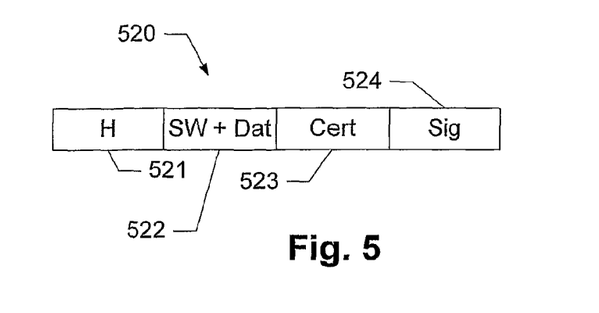
FIG. 5 illustrates an example of a message structure used in a loading process for loading software into a mobile terminal.

FIG. 5 illustrates an example of a message structure used in a loading process for loading software into a mobile terminal. The message 520 comprises a header section 521, a payload section 522, a digital certificate section 523, and a digital signature 524.

The payload section 522 comprises the actual payload data to be loaded into the mobile terminal. The payload data may comprise software, such as application software, pre-loader software for organising and/or controlling the loading of other software, parts of the operating system of the mobile terminal, or the like. Alternatively or additionally, the payload data may comprise other data, e.g. configuration data for storage into the flash memory or other memories of the mobile terminal, e.g. an EPROM, an EEPROM or the like.

The header section 521 comprises information relevant to the loading process, such as information about the payload data, e.g. version control data, information about the mobile terminal, control parameters that determine how the mobile terminal should process the data, and/or the like.

The signature section comprises a digital signature of the payload 522. The digital signature is calculated using a public-private key pair of an asymmetric cryptosystem, e.g. the RSA (Rivest, Shamir, and Adleman) system. The digital signature is calculated by initially calculating a one-way hash function of the payload data, i.e. of the software and/or data to be loaded into the mobile terminal. The calculated hash value is then encrypted with the private key of the public-private key pair.

A one-way hash function is used to derive the hash value representative of the payload data 522. The public/private key system is used to provide security for the valid hash value and authenticate the loading station or data transfer device from which the message 520 is sent.

A one-way hash function is a function that is simple to compute in a forward direction, but difficult to compute in a reverse direction. A one-way hash function, H(M), operates on an arbitrary-length input, M, which in some embodiments is comprised of the payload data 522 or selected parts of the payload data. The hash function performed on M returns a fixed-length hash value, h=H(M).

There are many functions that can take an arbitrary-length input and return an output of fixed length, but one-way hash functions have the following additional characteristics: given M, it is easy to compute h; given h, it is hard to compute M; and given M, it is hard to find another message, M', such that H(M)=H(M'). The aim of the one-way hash is to provide a unique signature, or fingerprint of M. The output of a hash function is referred to as the hash value or a message digest.

In embodiments of the method described herein, prior to transmission of the message 520 to the mobile terminal a secure one-way hash function is performed on the payload data 522, or selected contents thereof, to produce a reference hash value. The reference hash value is included into the message 520 as a digital signature as further described below. Upon receipt of the message 520, the mobile terminal calculates an audit hash value of the payload data 522 (or the selected contents thereof) and compares the audit hash value with the reference hash value received as part of the message 520.

A suitable one-way hash function is for example the SHA-1 function. Other examples of suitable functions include the MD5 algorithm, Snerfu, H-Hash, MD2, MD4, or the like.

Public key algorithms use two keys, one publicly available and one privately held (secret) for tasks such encrypting and decrypting messages, message authentication, and digital signatures. When a sender encrypts a message with the private key, any recipient with a corresponding public key can be assured of the sender's authenticity, since only a sender in possession of the private key was able to encrypt the message. It is the latter scheme that is utilized to authenticate the payload data in accordance with the loading process described herein. A suitable public key algorithm is the RSA algorithm. Other suitable examples include the Fiat-Shamir (FS) algorithm, ELGAMAL, DSA, Fiege-Fiat-Shamir, or the like.

In particular, in the loading process described herein, the calculated hash value is encrypted with the private key of the loading station (or of the generator of the payload) to produce the digital signature 524 that is included in the message 520.

The corresponding public key is included in a certificate that is included in the digital certificate section 523 of the message 520. A digital certificate is a data structure used in a public key system to bind a particular, authenticated individual to a particular public key. A digital certificate is a digital representation of information which identifies a certification authority issuing it, names or identifies the individual whose public key is included, and contains the individual's public key. The digital certificate is digitally signed by the certification authority issuing it, thereby allowing the recipient to authenticate the certificate by using the certification authority's public key.

It is understood that the digital certificate section may comprise a single digital certificate or a chain of certificates. In any case, the certificate or chain of certificates can be authenticated by the mobile terminal by means of a root public key corresponding to the single certificate or the last certificate in the certificate chain. An example of a key hierarchy in connection with the loading of software into mobile phones is described in WO 03/060673.

It is understood that in some embodiments the payload may, for the purpose of calculating the digital signature, be split up in smaller parts, as described in e.g. WO 03/060673, or the signature may only be calculated.

Typically it is desirable to protect the header data 521 as well as the payload data 522. In some embodiments this is achieved by protecting the header data 521 itself by a digital signature. In other embodiments, the above encryption of the calculated hash value further comprises encryption of a hash value calculated over the header data 521, e.g. by encrypting/signing a concatenation h(SW)|h(H) of the hash value h(SW) calculated over the software (and data) 522 and a hash value h(H) calculated over the header data 521.

Figure 6:
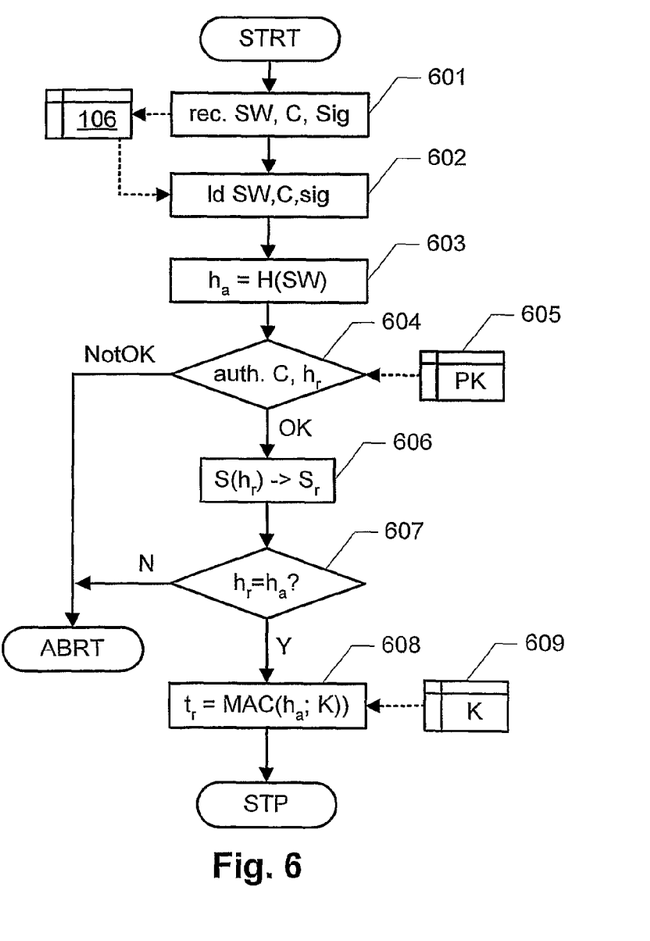
FIG. 6 shows a flow diagram of a software loading process for a first-time load of a software version.

FIG. 6 shows a flow diagram of a software loading process for a first-time load of a software version.

In initial step 601, the mobile terminal receives a software data packet from a reprogramming tool over a local or a remote interface, e.g. GSM, WCDMA, etc., as described above. The packet contains the new software SW, one or more certificates C, and a digital signature $S(h_r)$ of the protected software and data, as described in connection with FIG. 5 above. Optionally, the new software may include data, e.g. configuration data. The signature $S(h_r)$ comprises at least an encrypted hash value calculated from the software and data. The signature is calculated such that first a one-way hash $h_r=H(SW)$ of the software and data, SW, is calculated, and subsequently, at least the calculated hash value is encrypted with the private key of a public-private key pair, e.g. an RSA public-private key pair. The corresponding public key is included in a certificate that is included in the software data packet. Upon receipt of the software and data packet, the mobile terminal stores the software, data, certificate(s), and the signature in the external memory 106. As mentioned in connection with FIG. 5 above, in some embodiments the signature may protect not only the payload but also the header data, e.g. by encrypting a combination of a hash value calculated from the software and of a hash value calculated from the header.

In step 602 the processor of the mobile terminal reads the newly stored software and data, SW, the certificate(s), C, and the signature, $S(h_r)$, into its internal memory.

In step 603, the processor calculates a one-way audit hash value $h_a=H(SW)$ of the new software and data, SW.

In step 604, the processor reads a root public key, PK from a memory 605. In some embodiments, the root public key is securely stored, i.e. integrity protected. In one embodiment, the root public key is stored in the internal ROM of the processor, as described above. The processor uses the root public key PK to verify the signature $S(h_r)$ of the new software and data. If only one certificate is used, then the signature $S(h_r)$ is verified against the public key in the certificate C. The certificate C in turn is then verified against the root public key PK. If several certificates are used, the whole chain of certificates is verified. In that case, the signature of the last certificate in the chain is verified against the root public key. Hence, in step 604, the processor verifies the public key used to sign the new software and data. If the verification succeeds the processor proceeds at step 606 with verifying the signature. Otherwise, the software loading process is aborted.

In step 606, the processor decrypts the digital signature $S(h_r)$ of the software and data using the public key verified in step 604, resulting in the reference hash value $h_r$.

In step 607, the decrypted signature, i.e. the reference hash value $h_r$, is verified against the one-way audit hash value $h_a$ calculated in step 603. If the verification succeeds, i.e. if the audit hash value $h_a$ and the reference hash value $h_r$ are equal, the processor proceeds at step 608 with calculating a reference message authentication code (MAC). Otherwise, the software loading process is aborted.

In step 608, the processor uses the verified one-way hash value $h_a$ ($=h_r$) and a chip unique key, K (or a value derived from K), as input values to a MAC calculating function, resulting in a reference message authentication code value $t_r=MAC(h_a; K)$. The output value of the MAC function is the reference MAC value of the new software and data. In some embodiments, the chip unique key K is stored in a secure memory that is only accessible by the processor. For example the unique key K may be burnt into the chip during the fabrication process using e.g. so-called e-fuse technology. Embodiments of the message authentication code will be described below. The processor stores the new reference MAC value $t_r$ in the external memory 106 together with the new software and data SW. Optionally, the certificate(s) and the digital signature values are removed from the external memory.

The loading process described above is controlled by the processor of the mobile terminal. In a two-chip architecture as described in connection with FIGS. 3 and 4, the above steps are carried out by the chip 311 that is intended to subsequently execute the software.

The cryptographic functions for authenticating the received data and, in particular, the MAC function, may be performed by special-purpose software that is stored, e.g. as part of the boot code, in the internal ROM of the processor that performs the above steps.

Hence, the stored reference MAC value is now available for subsequent audits of the software and data by the processor. For example, in order to verify the integrity of the stored software, the processor calculates an audit hash value h(SW) of the stored software and data and an audit MAC value $t_a=MAC(h(SW); K)$ of the calculated audit hash value using the chip unique key K. The processor compares the calculated audit MAC value $t_a$ with the stored reference MAC value $t_r$. If the two values are equal, the integrity of the software is verified.

For example, such an audit may be performed during the boot process of the mobile terminal and/or each time the software is to be executed and/or periodically in predetermined time intervals, e.g. as described in U.S. Pat. No. 6,026,293.

Figure 7:
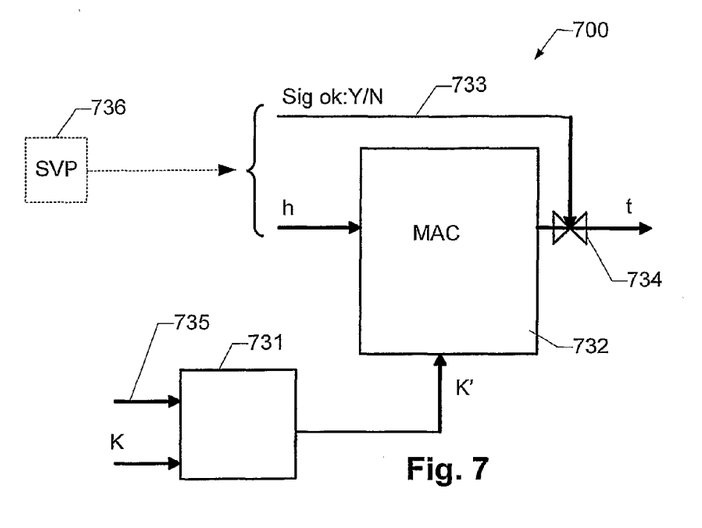
FIG. 7 illustrates the calculation of an embodiment of a message authentication code.

FIG. 7 illustrates the calculation of an embodiment of a message authentication code (MAC). A MAC is a function that takes a variable length input, M, and a key, K, to produce a fixed-length output, t, the so-called MAC value or tag value: t=MAC(M; K). In some embodiments, the MAC is defined such that for an intruder with knowledge of M but without information about the value of K, it is computationally hard (infeasible) to find a message M' different from M but with the same tag value. Furthermore, the MAC function may be defined such that it is hard for an intruder with knowledge of a message M but without information about the value of K to predict the correct tag value t. In the loading method described herein, a MAC is used to check the integrity of data stored in an unreliable or insecure medium, i.e. in this situation the MAC is used by only one party, i.e. the mobile terminal, when storing and retrieving the payload data. In some embodiments, the MAC function is based on a cryptographic hash function and, in particular, on the hash function H used for authenticating the received payload data as described above. This allows reuse of the hash value calculated during authentication of the received payload data when calculating the MAC value for subsequent integrity protection, thereby considerably reducing the computational effort for the computation of the MAC value and, thus, reducing the installation time.

FIG. 7 shows a block diagram of a MAC calculation module. The MAC calculation module comprises a MAC function calculator 732. The MAC function calculator 732 receives h as an input, h being the verified hash value that was calculated during the preceding signature verification process 736 for the received payload, i.e. $h=h_a$ or $h=h_r$. As a second input the MAC function 732 receives a secret key K' that is derived from a chip unique key K. In particular, the key K' may be generated using a pseudo random function 731, e.g. a pseudo random function that is based on a hash function, e.g. SHA-1, from a chip unique key K and a mode identifier 735. For example, the chip unique key K may be a random number generated during ASIC production of the chip. Deriving the key K' from the master key K has the advantage that different keys K' may be used for different purposes, e.g. for the protection of different types of software, of different parts of the software, etc., thereby assuring cryptographic separation and increasing the flexibility of the method. The mode identifier 735 allows the selection of different modes. For example, in a multi-chip scenario a different mode may be used for each target chip for which the software is intended. Examples of suitable MAC functions include HMAC (Keyed-Hashing for Message Authentication), Cipher Block Chaining (CBC) MAC using for example AES or a secure one-way hash function, e.g. CBC-MAC as specified in "Handbook of Cryptology", by A. J. Menezes, P. C van Oorschot, S. A. Vanstone, p. 353, CRC Press, 1997, where the AES block encryption cipher is used as block cipher E. The MAC function 732 produces a corresponding tag value t as described above.

To prevent unauthorised MAC value computations, the MAC circuitry only releases the computed MAC value t when successful signature verification preceded the computations. Hence, the MAC calculation module receives a further input 733 from the signature verification process 736 indicating whether the digital signature of the received payload data was verified successfully. Block 734 receives the tag value and the signal 733 as inputs and releases the calculated tag value only if the signal 733 indicates that the hash value h is a verified, i.e. authentic, hash value. For example, in the method of FIG. 6, the signal 733 is generated by step 607.

It is noted that the MAC computation module may be implemented as a separate MAC computation circuitry on the processor chip. Furthermore, the subsequent comparison between a computed MAC value and a reference value can be performed inside a comparison circuit attached to the MAC circuitry. Furthermore, the secret key K may be stored as part of that circuitry. Consequently, the entire MAC computation may be confined in a special-purpose circuit and, thus, does not require an exposure/release of the computed MAC outside the circuitry.

The MAC calculation of FIG. 7 can be further improved at very little computational cost to further include a secure version control and to break the predictability of the input h to the MAC computation. This alternative embodiment of a MAC calculation will now be described with reference to FIG. 8 and FIG. 9.

Figure 8:
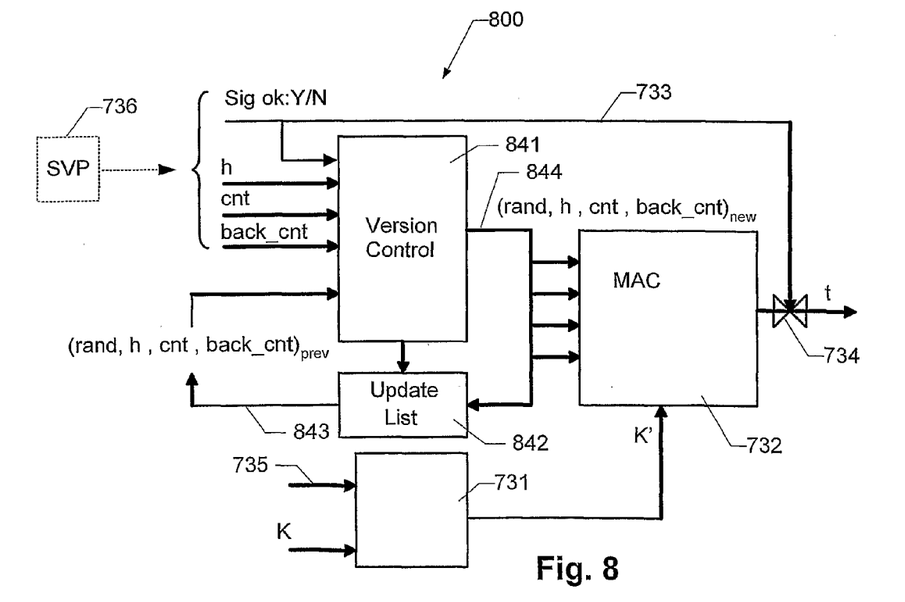
FIG. 8 illustrates the calculation of another embodiment of a message authentication code including a version control mechanism.
Figure 9:
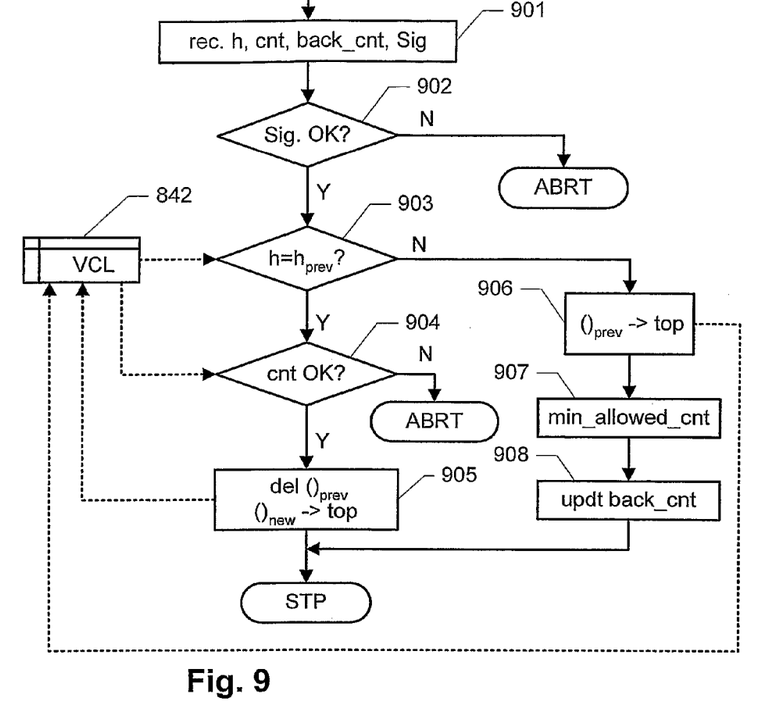
FIG. 9 shows a flow diagram of the version control process.

FIG. 8 illustrates the calculation of another embodiment of a message authentication code including a version control mechanism, and FIG. 9 shows a flow diagram of the version control process.

According to this embodiment of a MAC circuit 800, the MAC computation in block 732 is performed on a four-tuple (rand, h, cnt, back_cnt) 844. The four-tuple 844 comprises a short (e.g. 64 bit) random value, rand, that assures that the input to the MAC computation is not under full control by the inputs from the signature verification process 736. The four-tuple further comprises the verified hash value h as in the previous embodiment. Finally, the four-tuple comprises a version control counter, cnt, and a version control back counter, back_cnt, of a version control mechanism described in the following. The MAC function 732, e.g. HMAC, CBC-MAC, or the like, further receives the secret key K' as described in connection with FIG. 7 and calculates a MAC value t from the four-tuple and the secret key K'. Likewise, as described in connection with FIG. 7, the calculated tag value t is only released if the signature signal 703 indicates that the signature verification process has verified the hash value h.

The four-tuple 844 is generated by a version control module 841 that maintains a version control list 842 of previously received software versions. In particular, the version control list 841 comprises a list of data records where each data record comprises a four-tuple corresponding to a previously observed hash value. The record with the most recent hash value is referred to as the top element of the list 842 which corresponds to the software that is actually installed/in use.

The version control module 841 receives the verified hash value h and a digital signal 733 indicating that the signature was verified successfully from the signature verification process as described above. Furthermore, the version control module 841 receives from the signature verification process 736 the software version counter, cnt, and a number back_cnt. The number back_cnt indicates how many previous versions may still be installed, once a given software version has been installed. For example, back_cnt may be a number between 0 and $C_{MAX}$, e.g. $C_{MAX}=15$, where back_cnt=0 means that the new software does not allow that it is replaced with a previous version at all. Hence, back_cnt implements a simple but effective mechanism for controlling backwards and forward compatibility of the loaded software. In some embodiments, the values of cnt and back_cnt are received as part of the software packet that is received during the loading process, e.g. as part of the header section of the received software packet.

Upon receipt (step 901) of a new hash value h, a new counter cnt, a new back_cnt value, and a signal 733 from the signature verification process 736 during a loading process, the version control module 841 uses the signal 733 to verify (step 902) whether the hash value h has been verified during the signature verification process 736. If this is not the case, the version control module 841 blocks the value of h, i.e. the version control and MAC calculation process is aborted. If the signal 733 indicates that the hash value is authentic, the version control module 841 continues at step 903.

At step 903, the version control module 841 compares the received hash value with the hash values in the version control list 842. If the received hash value h equals one of the previous hash values $h_{prev}$ in the version control list 842, the version control module 841 continues at step 904; otherwise the process continues at step 906.

At step 904, i.e. in case the received hash value h equals one of the previous hash values $h_{prev}$, the process retrieves the corresponding four-tuple (rand, h, cnt, back_cnt)$_{prev}$ and determines whether the counter value $cnt_{prev}$ of the previous version is in the allowed range as defined by the values cnt and back_cnt received from the signature verification process 736. In some embodiments, the allowed range is defined as the range [$cnt_{top}$-back_cnt, ∞), where $cnt_{top}$ is the cnt value of the current top element of the list. For simplicity, it is assumed that there is no upper limit on the range of allowed values. However, it is understood that, in other embodiments, an upper limit may be defined.

If $cnt_{prev}$ is in the allowed range, the version control module 841 generates (step 905) a new four-tuple (rand, h, cnt, back_cnt)$_{new}$ with components rand$_{new}$=new random value generated by the version control module 841, $h_{new}$=h, $cnt_{new}$=$cnt_{prev}$, back_cnt$_{new}$=back_cnt$_{prev}$, and the version control module replaces the previous tuple with the same h value with the new tuple, and sets the new tuple as the top element in the list.

In case the test in step 903 reveals that h is not equal to one of the previous hash values, the new random value, hash value h, and counter are stored together with the allowed back_cnt (associated with this h) in the version control list (step 906). In this case, the new four-tuple (rand, h, cnt, back_cnt)$_{new}$ is created according to: rand$_{new}$=new random value, $h_{new}$=h, $cnt_{new}$=cnt, back_cnt$_{new}$=min(back_cnt, cnt−min_allowed_version) and the new tuple will become the top element in the list. Here, min_allowed_version is the current lowest allowed version by any tuple in the update list. After the entry has been placed on top in the update list the min_allowed_version is recomputed as $cnt_{top}$-back_cnt$_{top}$, i.e. from the counter $cnt_{top}$ and the back_cnt version of the top element (step 907). Finally, all elements in the list are updated (step 908) so that their back_cnt values are the largest possible values that do not give a version number that is lower than the least allowed version min_allowed_version. If the list contains an entry with a version that falls out of the allowed range, this entry will be deleted.

In some embodiments, a MAC check value (MACLIST) is associated with the version control list to prevent unauthorized manipulation of the entries in the list, thereby further increasing the security of the method. The MACLIST value is updated only when the list has been updated, i.e. after a successful signature verification. Prior to accessing/using the version control list the current MAC check value can be checked against the MACLIST value. To prevent unauthorised MACLIST value computations, the MAC circuitry will only release the computed MAC value when a successful signature verification preceded the computations (as controlled by block 734 in FIGS. 7 and 8).

Hence, the stored reference MAC value and the version control list are now available for subsequent audits of the software and data by the processor. For example, in order to verify the integrity of the stored software, the processor calculates an audit hash value $h_a$=h(SW) of the stored software and data and generates an audit tuple (rand, $h_a$, cnt, back_cnt) with the values rand, cnt, and back_cont retrieved from the version control list. From this, the processor calculates an audit MAC value $t_a$=MAC((rand, $h_a$, cnt back_cnt); K) of the calculated audit tuple using the chip unique key K. The processor compares the calculated audit MAC value $t_a$ with the stored reference MAC value $t_r$. If the two values are equal, the integrity of the software is verified.

As described above, such an audit may be performed during the boot process of the mobile terminal and/or each time the software is to be executed and/or periodically in predetermined time intervals.

Figure 10:
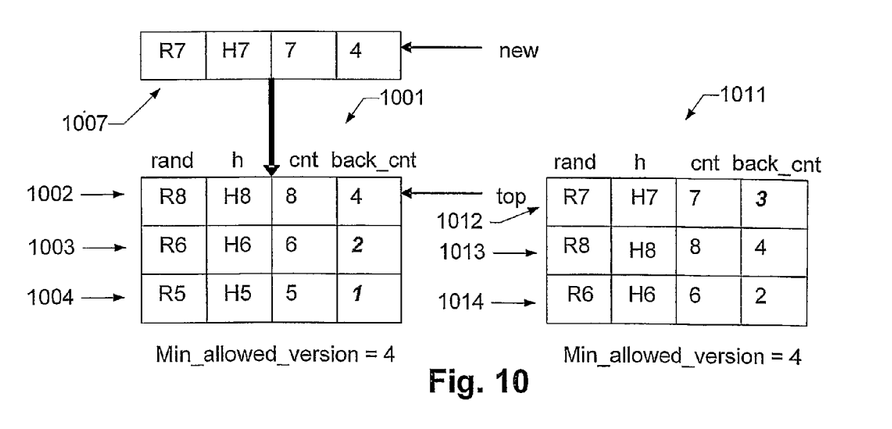
FIG. 10 illustrates an example of a version control mechanism.

The above process will now be further illustrated by way of example and with reference to FIG. 10.

FIG. 10 illustrates an example of a version control mechanism where a version control list of size 3 is used, i.e. the version control list can store three tuples. In this example, it is further assumed that there is a sequence of 8 software version releases with the following values (h, cnt, back_cnt) of the hash value h, the version counter cnt and the back counter back_cnt received from the signature verification process:

Version 1: (H1, 1, 0),
Version 2: (H2, 2, 1),
Version 3: (H3, 3, 2),
Version 4: (H4, 4, 3),
Version 5: (H5, 5, 2),
Version 6: (H6, 6, 3),
Version 7: (H7, 7, 4), and
Version 8: (H8, 8, 4).

It is further assumed that the above versions have been applied in sequence except version 7 that was not applied. FIG. 10 shows the version control list 1001 after installation of version 8. Each row of the version control list 1001 includes the corresponding four-tuple for one of the installed versions: Row 1002, the top element of the list, corresponds to version 8, row 1003 corresponds to version 6, and row 1004 corresponds to version 5. R8, R6, and R5 are the random numbers generated by the version control module as described above. After version 8 was applied the lowest allowed version was 4 (since cnt of version 8 is 8 and back_cnt of version 8 is 4 and 8−4=4), thus min_allowed_version=4. Accordingly, the back_cnt values of the remaining entries in the list were adjusted during the installation of version 8 to meet the limit on the lowest allowed version after version 8 has been added. In particular, the back_cnt value in row 1002 was set to 2 and the back_cnt value in row 1003 was set to 1. Prior to the update with version 8, the lowest allowed version was 3, but this value was raised to 4 through version 8.

FIG. 10 further shows the version control table 1011 after installation of version 7. First of all, the counter value cnt of version 7 is 7, i.e. in the allowed range of the current version. The hash value H7 does not yet exist in the version control list 1001, hence a new four-tuple 1007 with the new hash value H7 is stored as the new top element 1012 of the version control table 1011. The previous top element is moved down in the list and corresponds to row 1013. Version 6 is now placed in row 1014, while version 5 is removed from the list, because in this example, there is only room for three four-tuples in the version control list. The value of back_cnt of the new top element 1012 is set to 3 in order to meet the limit of the current lowest allowed version (min_allowed_version=4).

Figure 11:
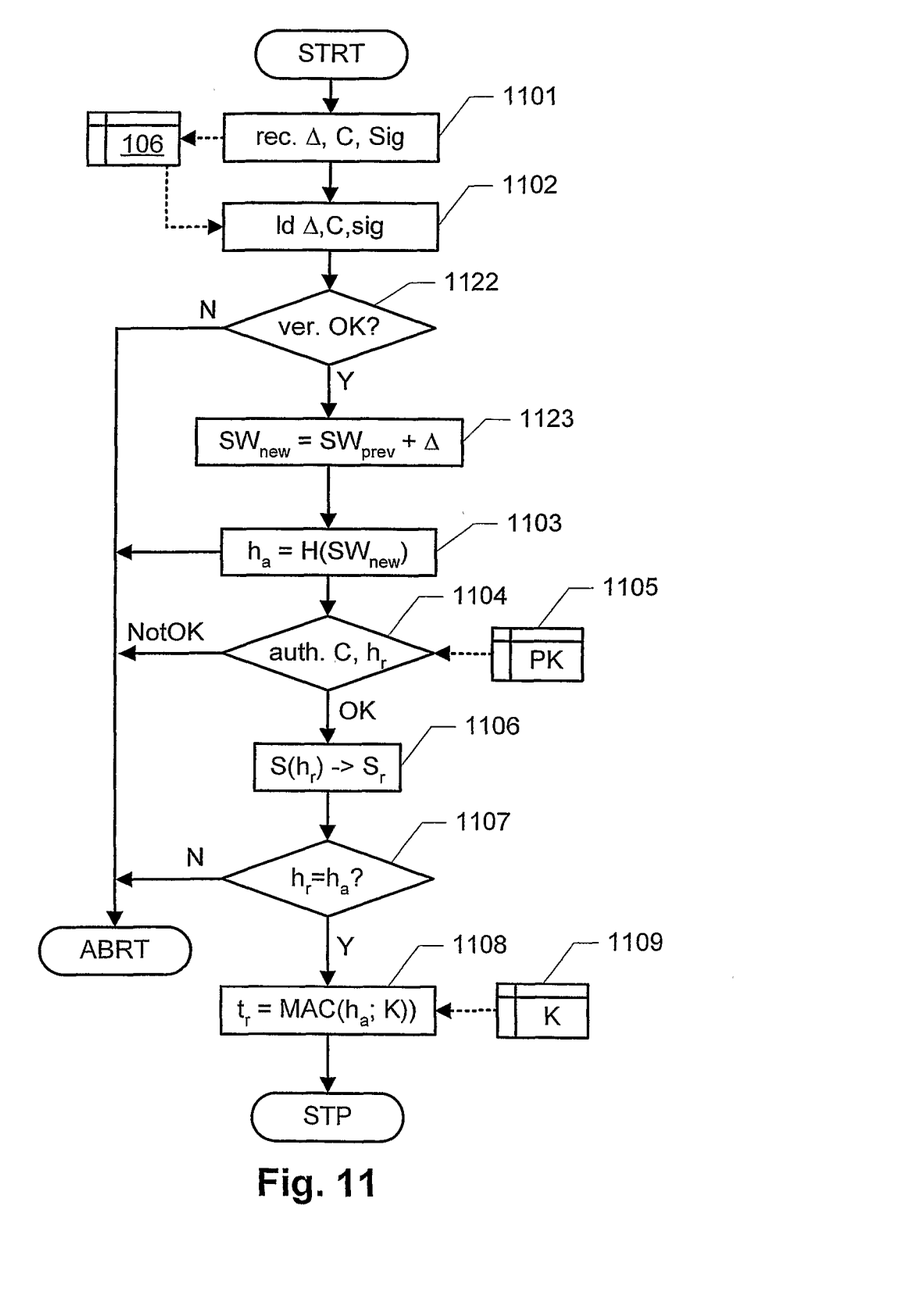
FIG. 11 shows a flow diagram of a software loading process for a software upgrade.

FIG. 11 shows a flow diagram of a software loading process for a software upgrade. The process is similar to the process shown in FIG. 6 for loading a software for the first time.

In initial step 1101, the mobile terminal receives a software upgrade data packet from a reprogramming tool over a local or a remote interface, e.g. GSM, WCDMA, etc., as described above. The packet contains the new software upgrade A, one or more certificates C, and a digital signature $S(h_r)$ of the protected software, as described in connection with FIG. 5 above. Optionally, the software may further include data, e.g. updated configuration data. In one embodiment, the new software is loaded as a so-called delta-file including the differences of the new software relative to the current software, thereby reducing the size of the upgrade packet. Delta-file techniques are known in the art and described in e.g. "Delta storage for arbitrary non-text files", by Christian Reichenberger, Proc. Of the 3rd International Workshop on Software Configuration Management, pp. 144-152, Norway, June 1991. Alternatively other upgrade file generation methods may be used or the entire new software may be received. The signature $S(h_r)$ comprises an encrypted hash value calculated from the new software. The signature is calculated such that first a one-way hash $h_r=H(SW)$ of the new software, SW, is calculated, and subsequently, the hash value is encrypted with the private key of a public-private key pair, e.g. an RSA public-private key pair. The corresponding public key is included in a certificate that is included in the software upgrade packet. Upon receipt of the software upgrade packet, the mobile terminal stores the software upgrade, certificate(s), and the signature in the external memory 106.

In step 1102 the processor of the mobile terminal reads the newly stored software upgrade, the certificate(s), C, and the signature, $S(h_r)$, into its internal memory.

In step 1122, the processor performs a version control. The mobile terminal has received a software version number of the new software version as part of the upgrade packet. The software version number of the new software image is checked against the version number of the current software stored on the external memory (protected by a MAC). If the new software version number is lower than the old software version number, the mobile terminal aborts the update process. In another embodiment, the version control process described in connection with FIGS. 8 and 9 is performed.

If the version control of step 1122 has succeeded, the process continues at step 1123, where the processor generates the new software $SW_{new}$ from the received delta-file $\Delta$ and the current software version $SW_{prev}$ stored on the external memory (protected by a MAC).

In step 1103, the processor calculates a one-way audit hash value $h_a=H(SW_{new})$ of the new software $SW_{new}$.

In step 1104, the processor reads a root public key, PK, from a memory 1105. In some embodiments, the root public key is securely stored, i.e. integrity protected. In one embodiment, the root public key is stored in the internal ROM of the processor, as described above. The processor uses the root public key PK to verify the signature $S(h_r)$ of the new software. If only one certificate is used, then the signature $S(h_r)$ is verified against the public key in the certificate C. The certificate C in turn is then verified against the root public key PK. If several certificates are used, the whole chain of certificates is verified. In that case, the signature of the last certificate in the chain is verified against the root public key. Hence, in step 1104, the processor verifies the public key used to sign the new software. If the verification succeeds, the processor proceeds at step 1106 with verifying the signature. Otherwise, the software loading process is aborted.

In step 1106, the processor decrypts the digital signature $S(h_r)$ of the software using the public key verified in step 1104, resulting in the reference hash value $h_r$.

In step 1107, the decrypted signature, i.e. the reference hash value $h_r$, is verified against the one-way audit hash value $h_a$ calculated in step 1103. If the verification succeeds, i.e. if the audit hash value $h_a$ and the reference hash value $h_r$ are equal, the processor proceeds at step 1108 with calculating a reference message authentication code (MAC). Otherwise, the software loading process is aborted.

In step 1108, the processor uses the verified one-way hash value $h_a$ and a chip unique key, K (or a value derived from K), as input values to a MAC calculating function, resulting in a reference message authentication code value $t_r=MAC(h_a; K)$. The output value of the MAC function is the reference MAC value of the new software. In some embodiments, the chip unique key K is burnt into the chip during the fabrication process using e.g. so-called e-fuse technology. Alternatively, the key K is stored in another secure memory that is only accessible by the processor. Embodiments of the message authentication code have been described above. The processor stores the new reference MAC value $t_r$ in the external memory 106 together with the new software. The previous MAC value is deleted. Optionally, the certificate(s) and the digital signature values are removed from the external memory. The new software version $SW_{new}$ is stored in the external memory and the old software version is deleted.

The loading process described above is controlled by the processor of the mobile terminal. In a two-chip architecture as described in connection with FIGS. 3 and 4, the above steps are carried out by the chip 311 that is intended to subsequently execute the software.

Hence, in the above a powerful software signing mechanism for the protection of software for many different systems has been described. The mechanism is efficiently combined with a symmetric key based integrity protection mechanism for secure software storage. Once the SW has been installed in the platform, the symmetric key based mechanism is used, and advantage is taken from previously computations. Furthermore, a combined mechanism to protect and version control software is described herein.

The provided integrity protection at storage is particular advantageous in connection with a two CPU architecture, when the non-volatile memory is connected to an untrusted CPU, and where there is a need for SW updates.

Although some embodiments have been described and shown in detail, the invention is not restricted to them, but may also be embodied in other ways within the scope of the subject matter defined in the following claims.

In particular, the embodiments have mainly been described with reference to a mobile terminal as an example of a data processing device. It is understood, however, that the method, product means, and device described herein may also be applied to other data processing devices.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of loading data into a data processing device, comprising the steps of:
    receiving a payload data item by the data processing device;
    performing a cryptographic authentication process to ensure the authenticity of the payload data item by calculating an audit hash value of at least the received data item;
    storing the authenticated received payload data item in the data processing device; and
    integrity protecting the stored payload data item, the integrity protecting comprising
        calculating a reference message authentication code value of a combined data item derived from at least the audit hash value and a random number or at least the audit hash value and a version control data item, wherein
            the calculating uses a secret key stored in the data processing device as an input.

2. The method according to claim 1, wherein the step of performing a cryptographic authentication process further comprises:
receiving a reference hash value; and
comparing the received reference hash value with the calculated audit hash value to verify the authenticity of the received payload data item.

3. The method according to claim 2, wherein the step of performing a cryptographic authentication process includes digitally signing the data item according to a public key cryptosystem.

4. The method according to claim 3, further comprising the steps of:
receiving the payload data item, a digital signature data item and a digitally signed digital certificate data item, wherein the digital certificate data item includes a first public key and wherein the digital signature data item includes a reference hash value encrypted with a first private key corresponding to the first public key;
authenticating the digitally signed digital certificate data item against a root public key stored in the data processing device;
authenticating the digital signature data item against the authenticated digital certificate; and
comparing the received reference hash value with the calculated audit hash value to verify the authenticity of the received payload data item.

5. The method according to claim 3, further comprising the step of cryptographically authenticating the reference hash value; and wherein the step of calculating the reference message authentication code value is performed only if the reference hash value is successfully authenticated.

6. The method according to claim 1, wherein the step of integrity protecting further comprises storing the calculated reference message authentication code value in relation to the received payload data item.

7. The method according to claim 1, further comprising the step of storing a version control data record in a version control data structure, the version control data record including information about the received payload data item including at least the version control data item.

8. The method according to claim 7, wherein the stored version control data record is integrity protected.

9. The method according to claim 7, wherein the version control data record comprises a version counter.

10. The method according to claim 9, wherein the version control data record further comprises a back counter identifying a number of previous versions that may replace the current version of the payload data item.

11. The method according to claim 1, wherein the secret key is a secret data item unique to the data processing device.

12. The method according to claim 1, wherein the secret key is a secret data item known only to the data processing device.

13. The method according to claim 1, wherein the step of receiving the payload data item further comprises the step of receiving a delta update of a previously received current data item, and
generating the payload data item as an updated payload data item from the previously received current data item and the received delta update.

14. A computer program run on a data processing device, comprising:
program code, stored on a non-transitory computer-readable storage medium, when executed by the data processing device, executes instructions adapted to cause the data processing device to receive a payload data item by the data processing device;
program code, stored on the non-transitory computer-readable storage medium, when executed by the data processing device, executes instructions adapted to cause the data processing device to perform a cryptographic authentication process to ensure the authenticity of the payload data item by calculating an audit hash value of at least the received data item;
program code, stored on the non-transitory computer-readable storage medium, when executed by the data processing device, executes instructions adapted to cause the data processing device to store the authenticated received payload data item in the data processing device; and
program code, stored on the non-transitory computer-readable storage medium, when executed by the data processing device, executes instructions adapted to cause the data processing device to integrity protect the stored payload data item, by calculating a reference message authentication code value of a combined data item derived from at least the audit hash value and a random number or at least the audit hash value and a version data control item,
wherein calculating the reference message authentication code value uses a secret key stored in the data processing device as an input.

15. A data processing device comprising
a first processing circuit adapted to:
receive a payload data item by the data processing device;
perform a cryptographic authentication process to ensure the authenticity of the payload data item by calculating an audit hash value of at least the received data item;
store the authenticated received payload data item in the data processing device; and
integrity protect the stored payload data item by calculating a reference message authentication code value of a combined data item derived from at least the audit hash value and a random number or at least the audit hash value and a version control data item,
wherein calculating the reference message authentication code value uses a secret key stored in the data processing device as an input.

16. The data processing device according to claim 15, further comprising storage means adapted to store the received payload data item; and a second processing circuit connected to the storage means and to the first processing circuit; wherein the second processing circuit is adapted to provide to the first processing circuit at least read access to the storage means.

17. The data processing device according to claim 15, wherein the first processing circuit comprises local storage means for storing a root public key of an asymmetric cryptographic system.

18. The data processing device according to claim 15, wherein the first processing circuit comprises local storage means for storing said secret key.

19. The method of claim 1, wherein the secret key is a chip-unique key stored in hardware.

* * * * *